United States Patent
Lauzon et al.

(10) Patent No.: US 7,051,105 B2
(45) Date of Patent: May 23, 2006

(54) SYSTEM AND METHOD FOR DISTRIBUTING MANAGEMENT EVENTS TO EXTERNAL PROCESSES

(75) Inventors: Shawn William Lauzon, Austin, TX (US); Qinhua Wang, Austin, TX (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 10/216,494

(22) Filed: Aug. 8, 2002

(65) Prior Publication Data

US 2004/0030775 A1   Feb. 12, 2004

(51) Int. Cl.
G06F 15/16 (2006.01)
(52) U.S. Cl. ...................... 709/227; 709/203
(58) Field of Classification Search ................ 709/203, 709/227
See application file for complete search history.

(56) References Cited

U.S. PATENT DOCUMENTS

| | | | | |
|---|---|---|---|---|
| 5,499,364 A | * | 3/1996 | Klein et al. ................... | 709/202 |
| 5,721,825 A | * | 2/1998 | Lawson et al. ............. | 709/203 |
| 5,828,882 A | * | 10/1998 | Hinckley .................... | 719/318 |
| 6,055,643 A |  | 4/2000 | Chaiken ...................... | 713/323 |
| 6,131,118 A | * | 10/2000 | Stupek et al. ................ | 709/223 |
| 6,167,448 A | * | 12/2000 | Hemphill et al. ........... | 709/224 |
| 6,272,559 B1 | * | 8/2001 | Jones et al. ................. | 719/330 |
| 6,298,378 B1 | * | 10/2001 | Angal et al. ................. | 709/223 |
| 6,317,743 B1 |  | 11/2001 | Heck ............................ | 707/10 |
| 6,349,333 B1 |  | 2/2002 | Panikatt et al. ............. | 709/223 |
| 6,754,704 B1 | * | 6/2004 | Prorock ....................... | 709/224 |
| 6,859,829 B1 | * | 2/2005 | Parupudi et al. ............ | 709/224 |
| 2002/0129110 A1 | * | 9/2002 | Liu et al. ..................... | 709/206 |
| 2002/0165998 A1 | * | 11/2002 | Hrebejk et al. ............. | 709/318 |
| 2003/0002634 A1 | * | 1/2003 | Gupta et al. ............. | 379/88.13 |

* cited by examiner

Primary Examiner—Ario Etienne
Assistant Examiner—Ciara Martin
(74) Attorney, Agent, or Firm—VanLeeuwen & VanLeeuwen; David A. Mims, Jr.

(57) ABSTRACT

A system and method for distributing management events to external process is presented. A notification listener registers with a client notification service that resides locally with the notification listener. The registration includes one or more notification types in which the notification listener wishes to be notified. The client notification service configures a remote proxy located on a server to provide notification events to the client notification service that have one of the notification types. The remote proxy receives notification events from a server notification service, and provides the notification events to the client notification service. In turn, the client notification service provides the notification events to the notification listener. The remote proxy may be configured for push processing or pull processing. When the remote proxy is configured for push processing, the remote proxy sends notification events to the client notification service without receiving a request from the client notification service. When the remote proxy is configured for pull processing, the remote proxy waits for a request from the client notification service before sending the notification events to the client notification service.

17 Claims, 7 Drawing Sheets

SYSTEM AND METHOD FOR DISTRIBUTING MANAGEMENT EVENTS TO EXTERNAL PROCESSES

BACKGROUND OF THE INVENTION

1. Technical Field

The present invention relates in general to a system and method for distributing management events to external processes. More particularly, the present invention relates to a system and method for a remote listener to receive notifications by registering on a local server.

2. Description of the Related Art

Computer systems have event emitters which broadcast events to one or more component listeners. For example, when a server malfunctions, an event describing the malfunction may be broadcast to one or more components that are listening for the particular event. Computer systems incorporate a notification service to manage event disbursement. The notification service typically has components, such as a local receiver, a local sender, and an event notifier, that communicate with each other to send and receive notifications.

A Java Management Extension (JMX) exists which includes an event notification mechanism. The JMX defines a set of interfaces to broadcast events, listen for events, and filter events. The notification mechanism is a standard vehicle for components in the computer system to emit events and receive responses to events. The JMX specification describes a notification mechanism within a local process. However, a challenge found with existing art is that it does not describe how to send events and receive responses in a distributed computer system, or multi-server, multi-client environment.

In a distributed computer system, two types of notification listeners may be present which are local notification listeners and remote notification listeners. A local notification listener is registered locally on the same server in which a notification service exists. A remote notification listener resides on a client or server other than where the notification service resides.

A challenge found with existing art is that existing art requires a remote listener to include additional packages such as an Enterprise Java Bean (EJB) stub library or other remote procedure calling (RPC) mechanisms. In other words, existing art requires the remote notification listener to include a transport protocol in its' code, which complicates the task of registering with a notification service.

What is needed, therefore, is a way for a remote notification listener to register on its' local server and receive events from a notification service located on a separate server

SUMMARY

It has been discovered that a remote receiver proxy may be used to disburse significant events to remote notification listeners. The remote receiver proxy is located on the same local server as the notification service. The remote receiver proxy is configured to receive notifications and provide the notifications to a client. The client appropriately disburses the notifications to remote notification listeners. New notification listeners register with the client to receive notifications.

The server includes a notification service, one or more notification emitters, and one or more remote receiver proxies. A notification emitter sends a new notification event to the notification service for processing. The notification service analyzes the new notification event, and identifies a notification type corresponding to the new notification event. For example, the notification service may identify a "websphere.ras.warning" notification type corresponding to the new notification. The notification service analyzes receiver registration profiles to determine which receivers both local and remote, are registered to receive the particular notification type.

The remote receiver proxy manages notifications intended for remote listeners which are registered at the client. The remote receiver proxy may be configured for push processing or pull processing. If the remote receiver proxy is configured for push processing, the remote receiver proxy automatically sends notifications to the client. Using the example described above, if the client is registered to receive "websphere.ras.warning" notification types, the notification service sends the new notification to the remote receiver proxy, which, in turn, sends the new notification to the client. If the remote receiver proxy is configured for pull processing, the remote receiver proxy stores notifications in a local storage area until it receives a request from the client to return corresponding notifications.

When the client receives a notification from the remote receiver proxy, the client analyzes the notification type to determine which remote notification listeners should receive the notification. The client uses a notification service and a local event management receiver to disburse the notification to the appropriate remote notification listeners. The clients' notification service may also send the notification to registered remote receiver proxies.

A new notification listener may wish to register with the client to receive notifications. During the registration process, the new notification listener informs the client as to which notification types it wishes to receive. The client analyzes the new notification listener's request, and determines whether the client is currently registered to receive the notification types from the remote receiver proxy. If the client is not currently registered for one of the new notification types, the client informs the server to register the remote receiver proxy for the new notification type. The next time the notification service receives a notification event with a corresponding new notification type, the notification service sends the notification event to the remote receiver proxy which sends the notification event to the client for processing.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
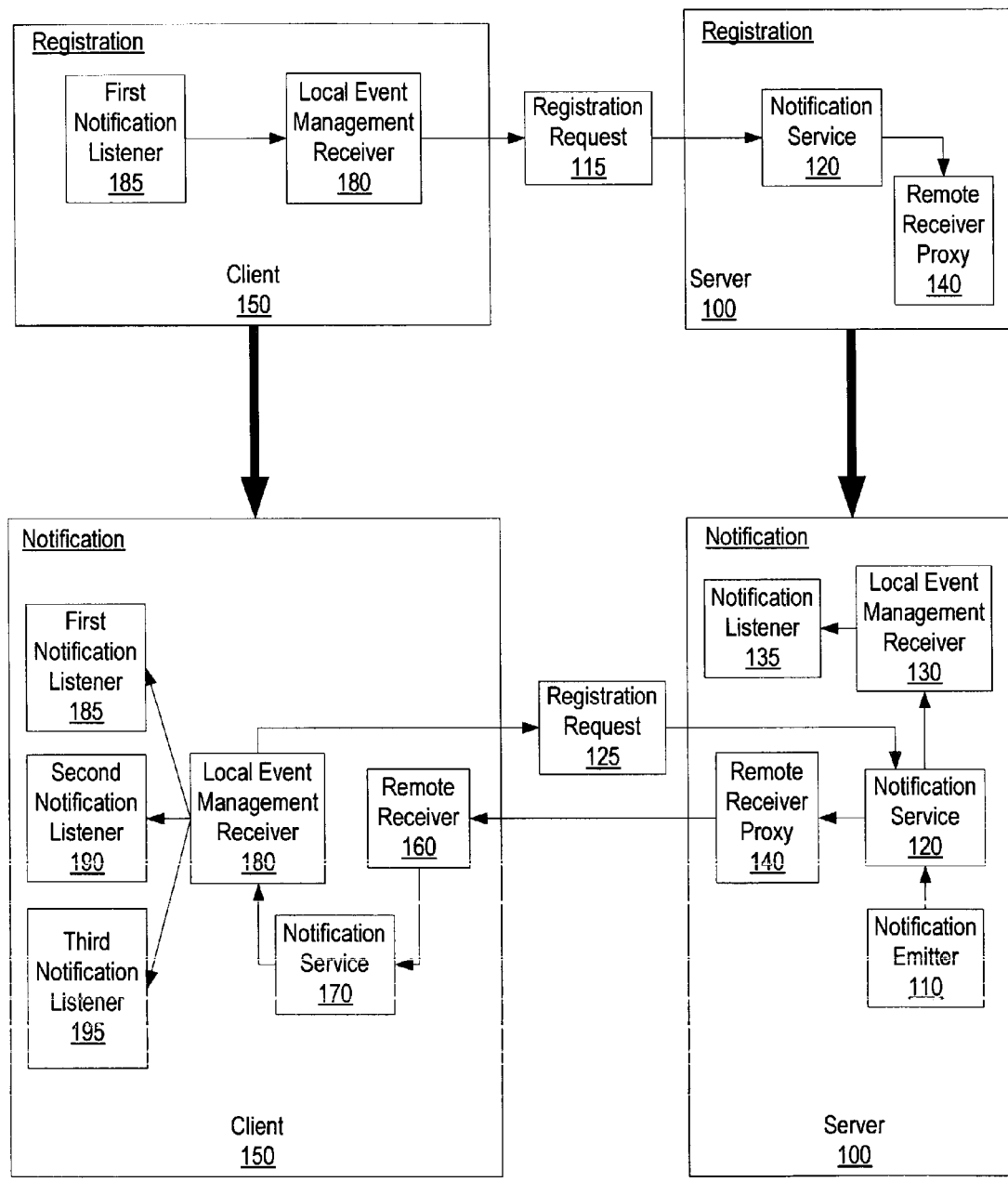
FIG. 1 is a high-level diagram showing a notification listener registering with a client and a server sending notifications to a local listener and remote listeners.

FIG. 1 is a high-level diagram showing a notification listener registering with a client and a server sending notifications to a local listener and remote listeners. During a registration stage, first notification listener 185 registers with client 150 using local event management receiver 180. Local event management receiver 180 determines whether client 150 is already receiving notifications corresponding to first notification listener 185's request (see FIG. 6 and corresponding text for further details regarding registration procedures). Client 150 and server 100 are computer systems that communicate with each other through a computer network, such as a Local Area Network (LAN) or the Internet.

If client 150 is not currently receiving notifications corresponding to first notification listener 185's request, local event management receiver 180 sends registration request 115 to notification service 120 which is located on server 100. Notification service 120 examines registration request 115 and creates remote receiver proxy 140 to interface with client 150.

During a notification stage, server 100 sends notifications to client 150 through a computer network, such as a LAN or the Internet. Server 100 includes notification service 120, notification emitter 110, local event management receiver 130, notification listener 135, and remote receiver proxy 140. Notification service 120 provides an interface to remote receivers through remote receiver proxy 140 and provides a local interface to local listeners through local event management receiver 130.

Notification emitter 110 sends a new notification event to notification service 120 for processing. Notification service 120 analyzes the new notification event, and identifies a notification type corresponding to the new notification event. For example, notification service 120 may identify a "websphere.ras.warning" notification type corresponding to the new notification. Notification service 120 analyzes receiver registration profiles to determine which receivers, both local and remote, are registered to receive the particular notification type (see FIG. 2 and corresponding text for further details regarding receiver registration analysis). A receiver is typically registered to receive a particular notification type based upon notification listener profiles corresponding to the receiver.

Local event management receiver 130 receives notifications from notification service 120, and distributes the notifications to appropriate notification listeners, such as notification listener 135. Using the example described above, notification listener 135 may be registered to receive "websphere.ras.warning" notification types. In this example, local event management receiver 130 is registered to receive "websphere.ras.warning" notification types in which case notification service 120 sends the new notification event to local event management receiver 130. In turn, local event management receiver 130 sends the new notification event to notification listener 135.

Remote receiver proxy 140 is located in server 100 and handles notifications corresponding to notification listeners located in client 150. Remote receiver proxy 140 may be configured for push processing or pull processing. If remote receiver proxy 140 is configured for push processing, remote receiver proxy 140 automatically sends notifications to remote receiver 160. Using the example described above, if remote receiver 160 is registered to receive "websphere.ras.warning" notification types, notification service 120 sends the new notification event to remote receiver proxy 140, which, in turn, sends the new notification event to remote receiver 160.

If remote receiver proxy 140 is configured for pull processing, remote receiver proxy 140 stores notifications in a local storage area until it receives a request from client 150 to return corresponding notifications.

When remote receiver 160 receives a notification from remote receiver proxy 140, remote receiver 160 sends the notification to notification service 170. Notification service 170 analyzes the notification and its' corresponding notification type. Notification service 170 directs the notification to receivers that are registered to receive the particular notification type, such as local event management receiver 180. Using the example described above, notification service 170 determines that local event management receiver 180 is registered to receive "websphere.ras.warning" notification types and sends the new notification event to local event management receiver 180.

Figure 5:
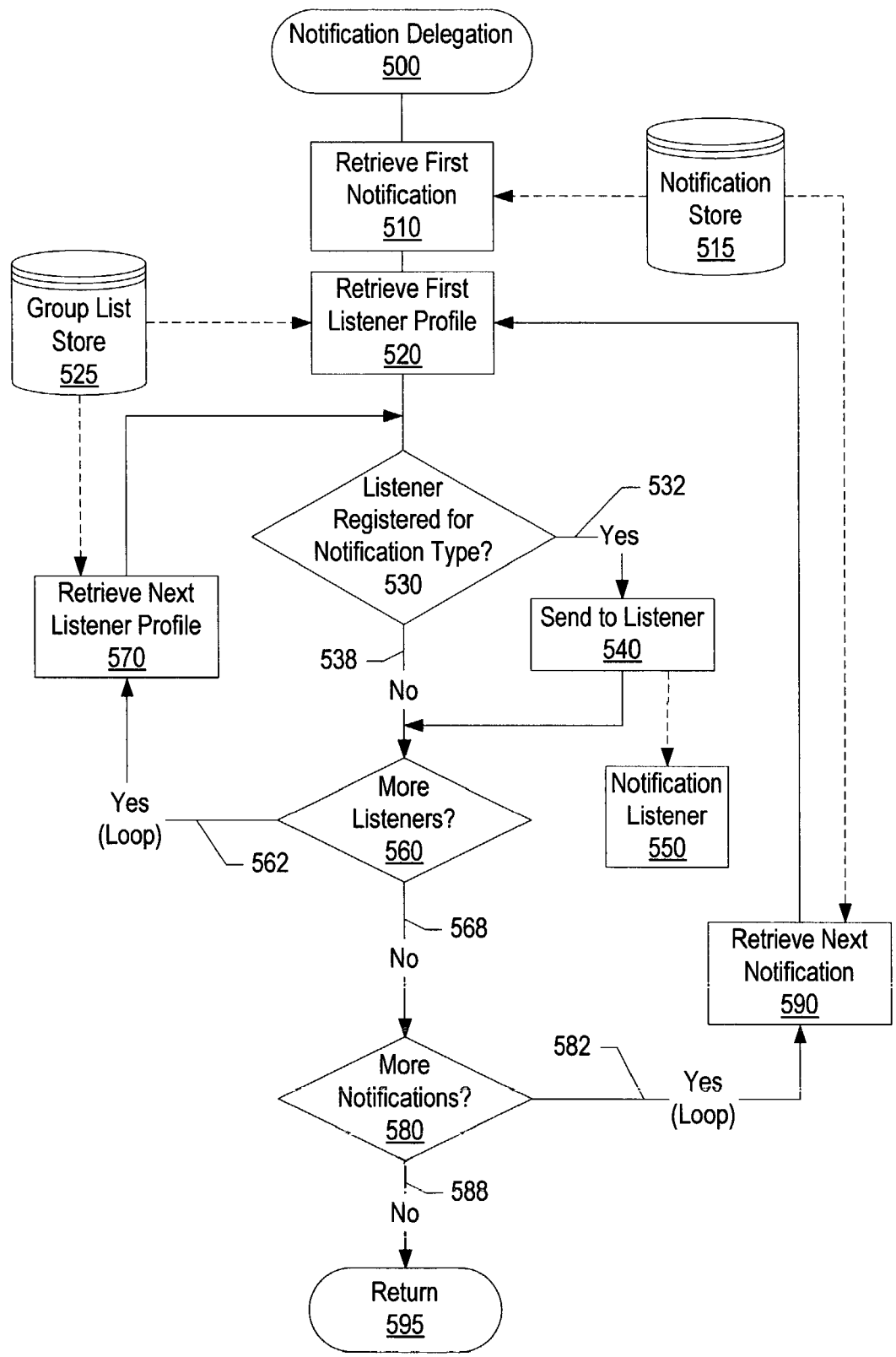
FIG. 5 is a flowchart showing steps taken in a receiver delegating notifications to notification listeners.

Local event management receiver 180 analyzes corresponding notification listener profiles to determine which notification listeners are registered to receive the notification type corresponding to the new notification event (see FIG. 5 and corresponding text for further details regarding listener delegation). Using the example described above, local event management receiver 180 may determine that first notification listener 185 may be registered to receive "websphere.ras.warning" notification types, but second notification listener 190 may not be registered to receive "websphere.ras.warning" notification types. In this example, local event management receiver 180 sends the new notification event to first notification listener 185 but does not send the new notification event to second notification listener 190.

Third notification listener 195 is a new listener which registers with local event management receiver 180. During the registration process, third notification listener 195 informs local event management receiver 180 of management receiver 180 determines whether it is currently registered for each new notification type. If local event management receiver 180 is currently registered for each new notification type, local event management receiver 180 may not inform notification service 120 of the new notification types since notification service 120 is currently configured to send the new notification types to notification service 170 (see FIG. 6 and corresponding text for further details regarding new listener registration).

On the other hand, if local event management receiver 180 is not currently registered for a particular new notification type, local event management receiver 180 sends registration request 125 to notification service 120 to register for the new notification type. The next time notification service 120 receives a notification event with a corresponding new notification type, notification service 120 sends the notification event to remote receiver proxy 140 which sends it to client 150 for processing.

Figure 2:
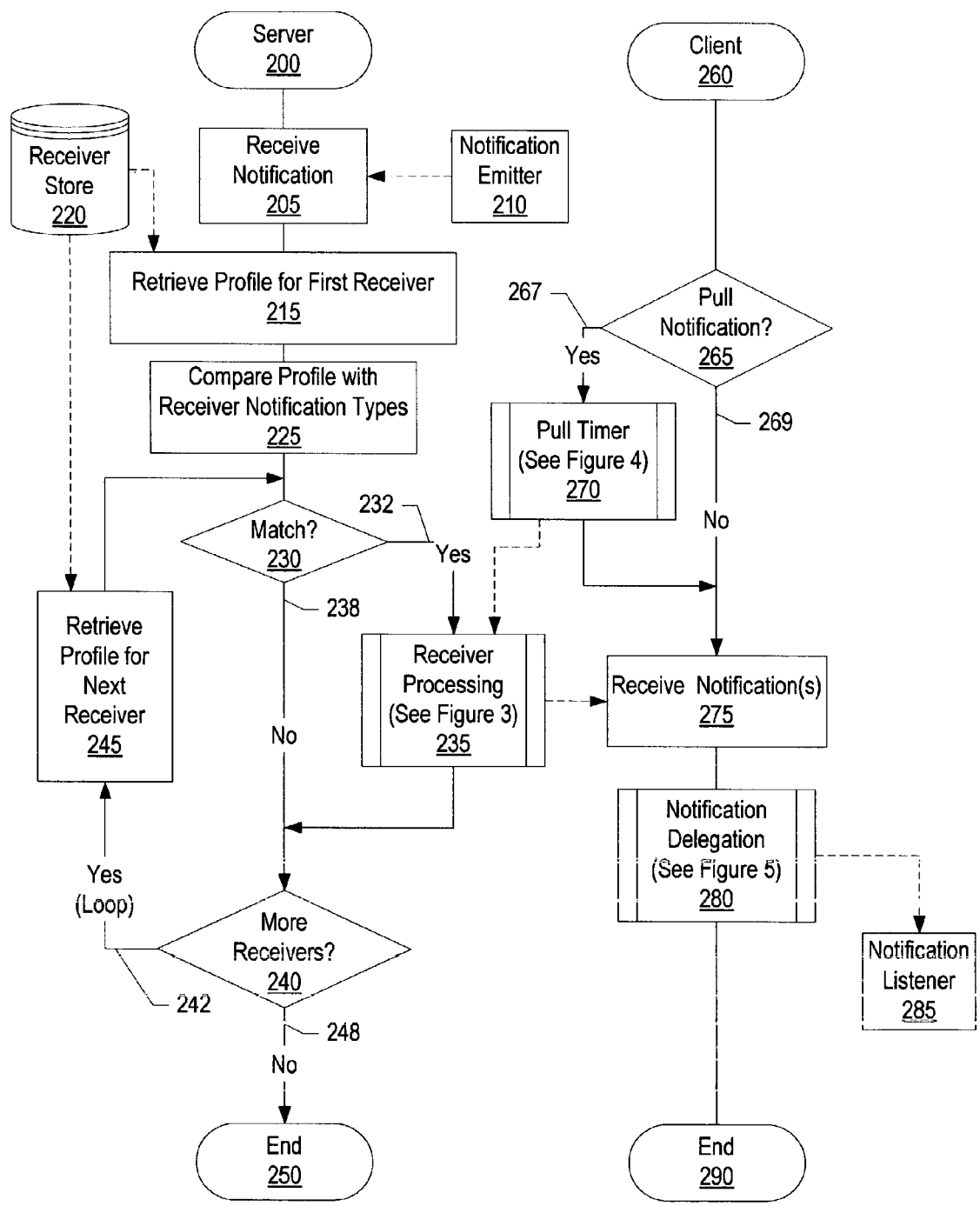
FIG. 2 is a high-level flowchart showing a server receiving events and providing the events to a client.

FIG. 2 is a high-level flowchart showing a server receiving events and providing the events to a client. Server processing commences at 200, whereupon the server receives an event from notification emitter 210 (step 205). Notification emitter 210 may be a process running on the server that detects events within the server.

Processing retrieves a first receivers' profile at step 215 from receiver store 220 (step 215). The receivers profile includes notification types corresponding to the type of notifications the receiver is registered to receive. For example, the first receiver may be registered to receive "websphere.ras.warning" notification types. Receiver store 220 may be stored on a non-volatile storage area, such as a computer hard drive. Processing compares a notification type corresponding to the received notification with the first receivers' profile at step 225. A determination is made as to whether the first receiver is registered to receive notifications with a notification type corresponding to the received notification (decision 230). If the first receiver is not registered to receive the received event type, decision 230 branches to "No" branch 238 bypassing receiver processing steps.

Figure 3:
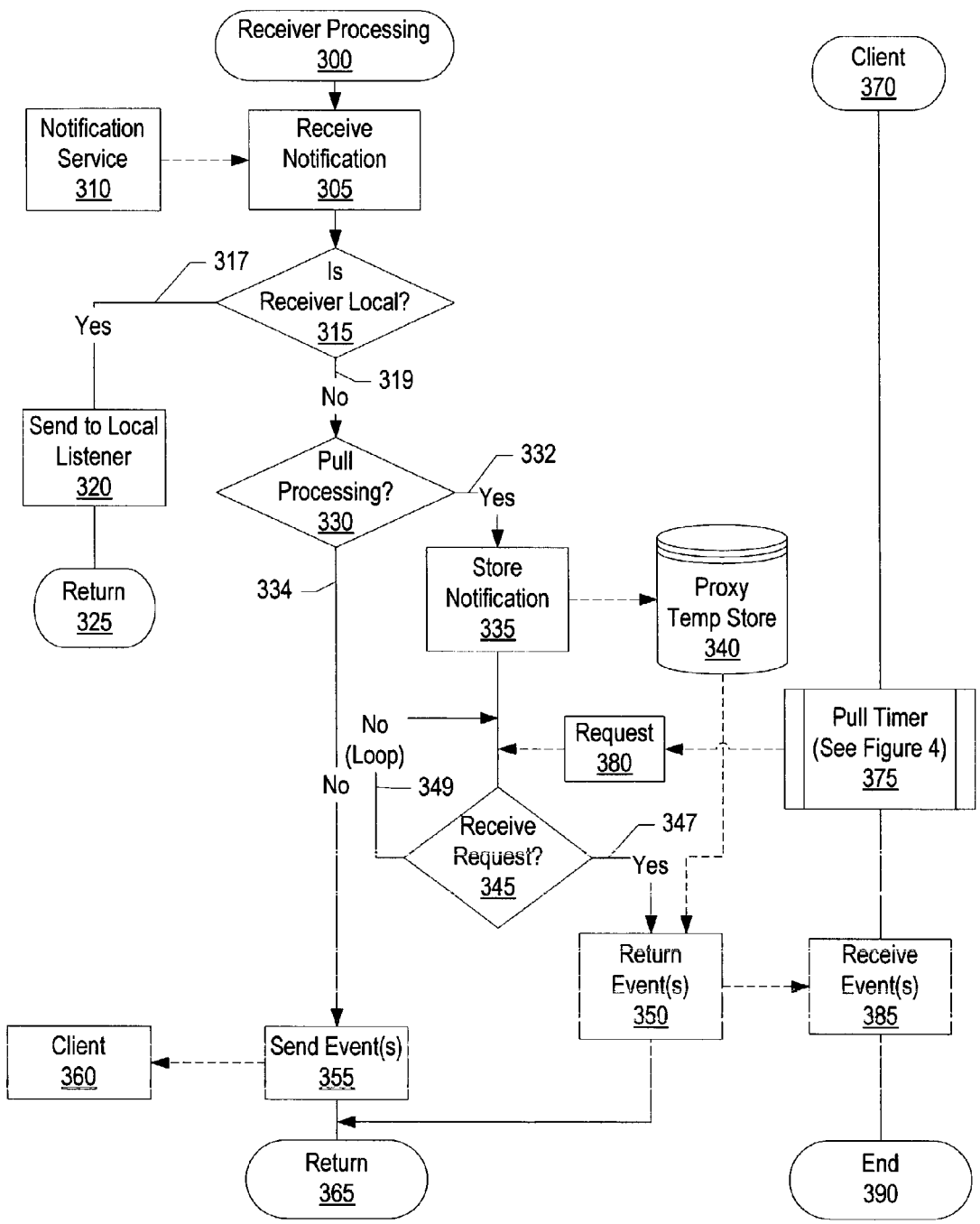
FIG. 3 is a flowchart showing steps taken in a receiver providing events to a local listener and a remote listener.

On the other hand, if the first receiver is registered to receive the received notification event, decision 230 branches to "Yes" branch 232 whereupon receiver processing processes the received event (pre-defined process block 235, see FIG. 3 and corresponding text for further details).

A determination is made as to whether there are more receiver profiles in receiver store 220 (decision 240). If there are more receiver profiles in receiver store 220, decision 240 branches to "Yes" branch 242 which loops back to retrieve (step 245) and process the next receiver profile. This looping continues until there are no more receiver profiles to process, at which point decision 240 branches to "No" branch 248. Server processing ends at 250.

Client processing commences at 260, whereupon a determination is made as to whether the client is configured for pull notification or push notification (decision 265). For example, the client-server transport protocol may not be able to initiate calls from a server to a client, such as HTTP, in which case the remote receiver proxy is configured for pull processing (i.e. the server waits for a client request before returning notification events).

Figure 4:
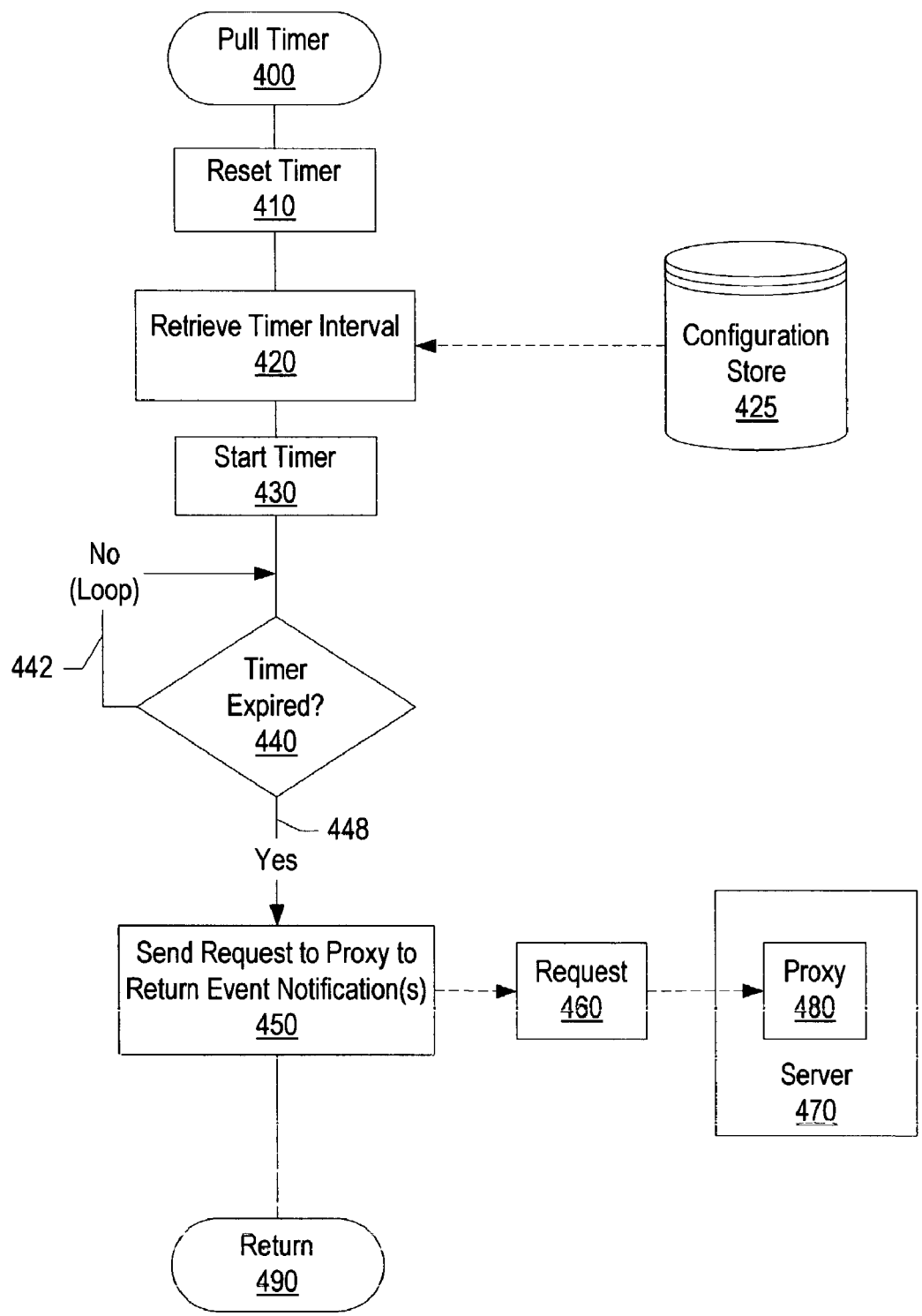
FIG. 4 is a flowchart showing steps taken in a client sending a pull request to a remote receiver proxy.

If the client is configured for pull processing, decision 265 branches to "Yes" branch 267 whereupon processing checks a pull timer (pre-defined process block 270, see FIG. 4 and corresponding text for further details). On the other hand, if the client is configured for push processing, decision 265 branches to "No" branch 269 bypassing pull timer steps.

The client receives one or more notifications at step 275. The client delegates the notifications to notification listeners, such as notification listener 285, based upon each notification listeners' registration (pre-defined process block 280, see FIG. 5 and corresponding text for further details). Client processing returns at 290.

FIG. 3 is a flowchart showing steps taken in a receiver providing events to a local listener and a remote listener. Receiver processing commences at 300, whereupon processing receives a notification from notification service 310 (step 305). A determination is made as to whether the receiver is a local receiver or a remote receiver proxy (decision 315). For example, the receiver may be a local receiver located on the same server as the notification service. If the receiver is a local receiver, decision 315 branches to "Yes" branch 317 whereupon the receiver send the notification to a registered local listener at step 320. Processing returns at 325.

On the other hand, if the receiver is a remote receiver proxy, decision 315 branches to "No" branch 319. A determination is made as to whether the remote receiver proxy is configured for pull processing or push processing (decision 330). For example, the client-server transport protocol may not be able to initiate calls from a server to a client, such as HTTP, in which case the remote receiver proxy is configured for pull processing. If the client is configured for push processing, decision 330 branches to "No" branch 334 whereupon the notification is sent to client 360 (step 355).

On the other hand, if the client is configured for pull processing, decision 330 branches to "Yes" branch 332 whereupon processing stores the notification in proxy temp store 340. Proxy temp store 340 may be stored on a non-volatile storage area, such as a computer hard drive.

Client processing commences at 370, whereupon pull timer processing sends request 380 to the receiver (pre-defined process block 375, see FIG. 4 and corresponding text for further details). Request 380 may be a request for the receiver to return notifications to the client.

A determination is made at the receiver as to whether a client request has been received (decision 345). If a request has not been received, decision 345 branches to "No" branch 349 which loops back to wait for a client request. This looping continues until processing receives a client request, a which point decision 345 branches to "Yes" branch 347 whereupon notifications are retrieved from proxy temp store 340 and returned to the client at step 350. Receiver processing returns at 365. The client receives the notifications at step 385, and client processing ends at 390.

FIG. 4 is a flowchart showing steps taken in a client sending a pull request to a remote receiver proxy. Pull timer processing commences at 400, whereupon processing resets a timer at step 410. Processing retrieves a timer interval from configuration store 425. The timer interval may be configured to send a request to the remote receiver proxy at regular intervals for the proxy to return notifications. For example, the system administrator may set the timer interval for a one-minute period, in which case a request is sent to the remote receiver proxy one time each minute. The pull request configuration is typically used to circumvent transport protocols that do not initiate a call to a client, such as HTTP. Configuration store 425 may be stored on a non-volatile storage area, such as a computer hard drive.

The timer is started at step 430. A determination is made as to whether the timer has reached the timer interval (decision 440). If the timer has not reached the timer interval, decision 440 branches to "No" branch 442 which loops back to check the timer expiration. This looping continues until the timer reaches the timer interval, at which point decision 440 branches to "Yes" branch 448 whereupon request 460 is sent to proxy 480. Request 460 includes a request for proxy 480 to return event notifications processed by server 470. Proxy 480 is located on server 470 and collects notification events processed on server 470. Processing returns at 490.

FIG. 5 is a flowchart showing steps taken in a receiver delegating notifications to notification listeners. Notification delegation processing commences at 500, whereupon processing retrieves a first notification with a corresponding notification type from notification store 515. For example, the first notification may have a "websphere.ras.warning" notification type. Notification store 515 may be stored on a non-volatile storage area, such as a computer hard drive.

Processing retrieves a first listener profile from group list store 525 (step 520). The first listener profile includes a list of notification types in which the first listener is registered to receive. Group list store 525 includes profiles for each local listener and may be stored on a non-volatile storage area, such as a computer hard drive. A determination is made as to whether the first listener is registered to receive the notification type corresponding to the first notification (decision 530). If the first listener is not registered to receive the first notification, decision 530 branches to "No" branch 538 bypassing notification transmittal steps. On the other hand, if the first listener is registered to receive the first notification, decision 530 branches to "Yes" branch 532 whereupon processing sends the notification to notification listener 550 (step 540). In one embodiment, listeners may be registered to receive notifications on a hierarchy basis. For example, a listener may be registered to receive "websphere.ras" notification types. In this example, the listener receives "websphere.ras.warning" and "websphere.ras.error" notification types.

A determination is made as to whether there are more listener profiles stored in group list store 525 (decision 560). If there are more listener profiles stored in group list store 525, decision 560 branches to "Yes" branch 562 which loops back to retrieve (step 570) and process the next listener profile. This looping continues until there are no more listener profiles to process, at which point decision 560 branches to "No" branch 568.

A determination is made as to whether there are more notifications to process in notification store 515 (decision 580). If there are more notification to process in notification store 515, decision 580 branches to "Yes" branch 582 which loops back to retrieve (step 590) and process the next notification. This looping continues until there are no more notifications to process, at which point decision 580 branches to "No" branch 588. Processing returns at 595.

Figure 6:
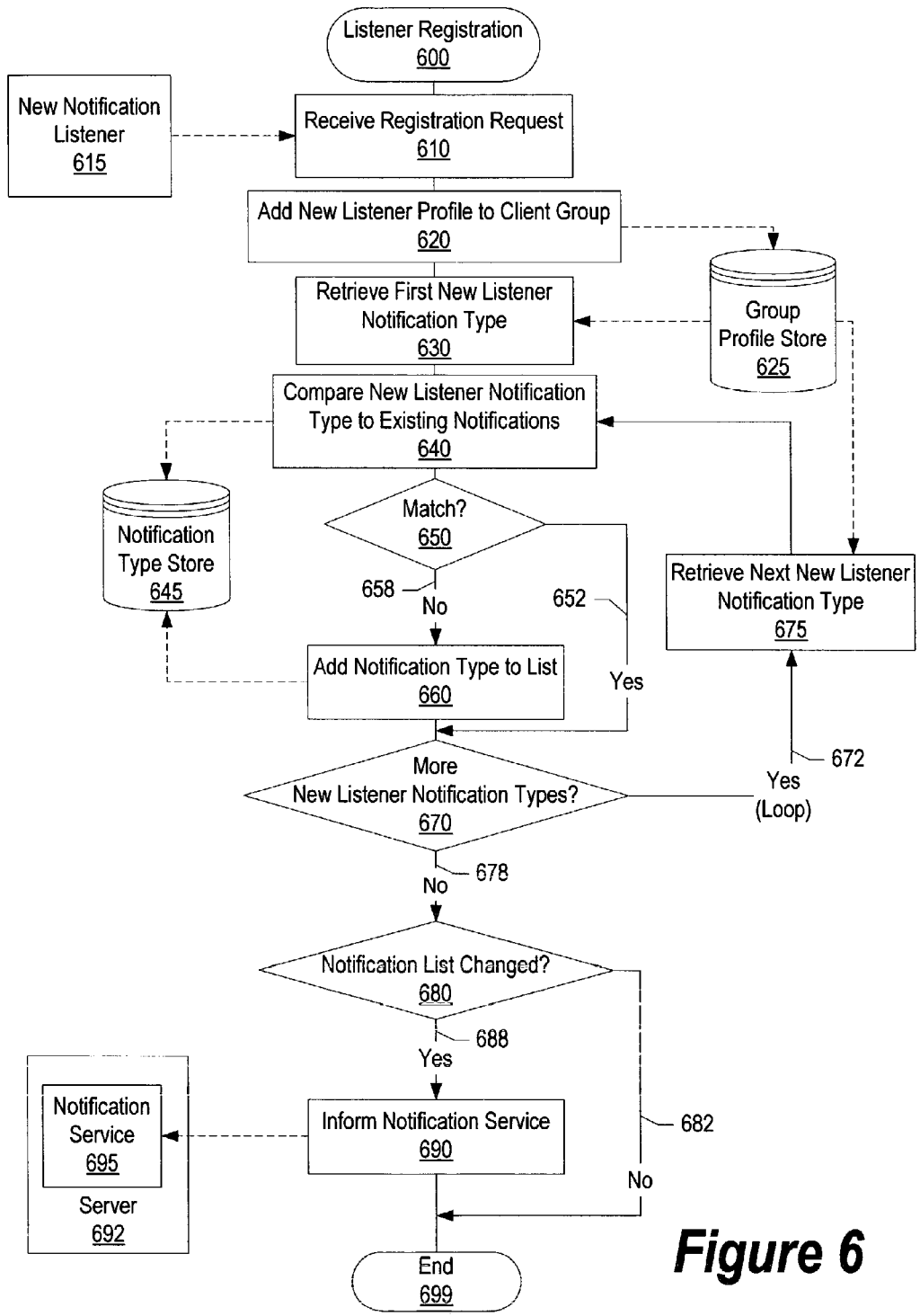
FIG. 6 is a flowchart showing steps taken in a notification listener registering to receive events.

FIG. 6 is a flowchart showing steps taken in a notification listener registering to receive events. Listener registration commences at 600, whereupon processing receives a registration request from new notification listener 615 (step 610). New notification listener 615 may be a client that wishes to receive particular notification events. The notification request includes one or more notification types in which new notification listener 615 wishes to be notified. Processing adds a new listener profile corresponding to the request in group profile store 625 (step 620).

Processing retrieves the first notification type corresponding to the new listener profile from group profile store 625 (step 630). Processing compares the first notification type with existing notification types in notification type store 645. Notification type store 645 includes a list of notification types that the corresponding receiver is currently registered to receive. Notification type store 645 may be stored on a non-volatile storage area, such as a computer hard drive.

A determination is made as to whether the first notification type matches one of the existing notification types in notification type store 645 (decision 640). In one embodiment, a hierarchy comparison may be performed. For example, "websphere.ras" encompass the notification types "websphere.ras.warning" and "websphere.ras.error" in a hierarchy comparison. If notification type store 645 includes the first notification type corresponding to the new notification listener, decision 650 branches to "Yes" branch 652, bypassing notification inclusion steps. On the other hand, if notification type store 645 does not include the first notification type corresponding to the new notification, decision 650 branches to "No" branch 658 whereupon the new notification type is added to notification type store 645 (step 660).

A determination is made as to whether there are more notification types corresponding to the new listener profile (decision 670). If there are more listener notification types corresponding to the new listener profile, decision 670 branches to "Yes" branch 672 which loops back to retrieve (step 675) and process the next new listener notification type. This looping continues until there are no more new listener notification types to process, at which point decision 670 branches to "No" branch 678.

A determination is made as to whether the notification list has changed in notification type store 645 (decision 680) This decision is made to minimize the number of messages sent to notification service 695. If the notification list has not changed, decision 680 branches to "No" branch 682 bypassing notification service updating steps. On the other hand, if the notification list has changed in notification type store 645, decision 680 branches to "Yes" branch 688 whereupon processing sends a message to notification service 695 informing notification service 695 of the changes (step 690). Notification service 695 resides on server 692. Processing ends at 699.

Figure 7:
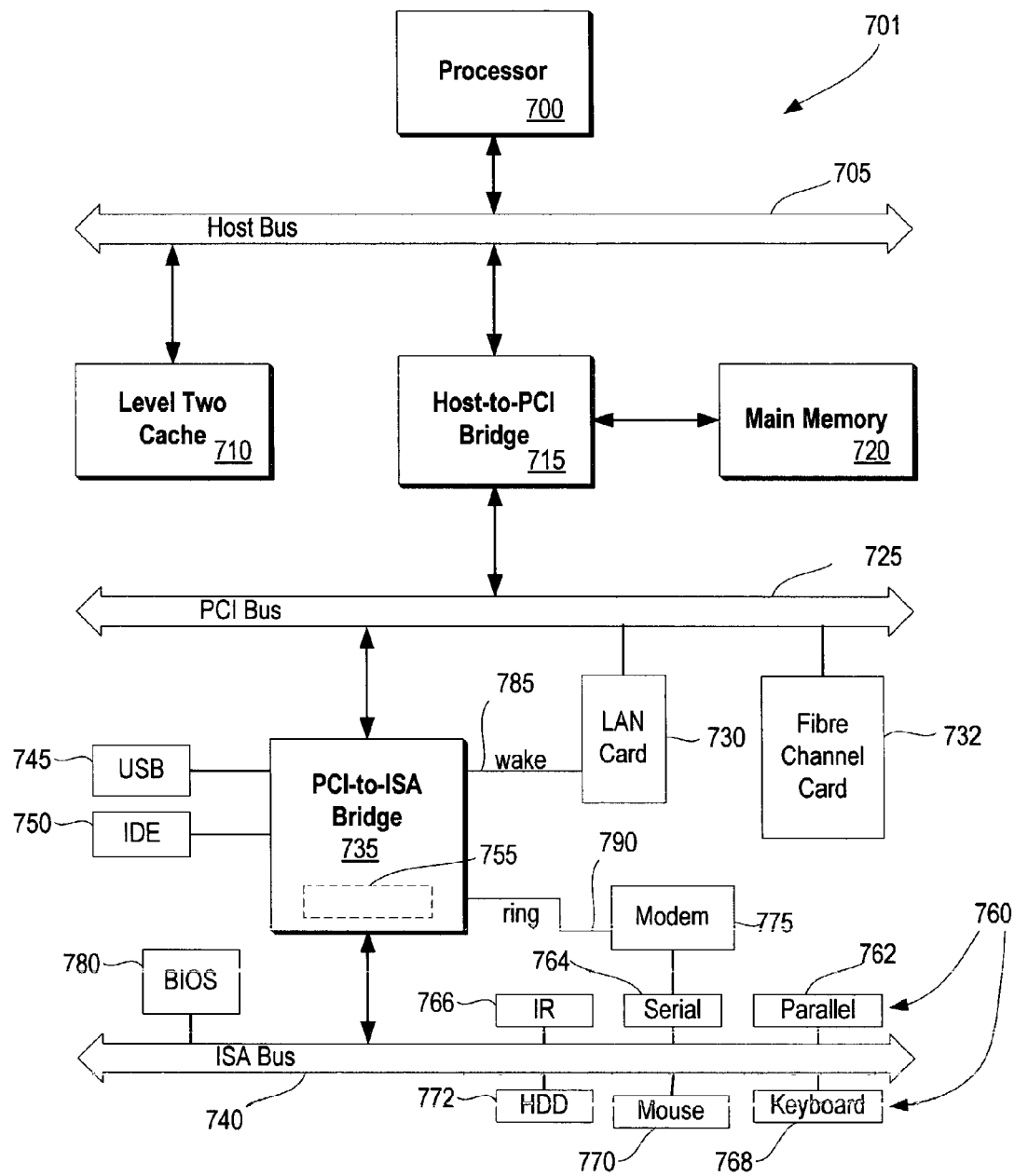
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of providing notifications to a client computer system, said method comprising:
   receiving a registration request from the client computer system at a server, the registration request including one or more first notification types;
   creating a remote receiver proxy on the server that is adapted to provide the client computer system the notifications that match the first notification types;
   comparing one or more received notifications with the first notification types;
   providing, from the remote receiver proxy, one or more of the received notifications with notification types matching the first notification types to the client computer system;
   detecting, at the client computer system, whether a notification listener is registered to receive one or more of the received notification types; and
   sending, at the client computer system, one or more of the received notifications to the notification listener in response to the detecting.

2. The method as described in claim 1 wherein the providing further includes:
   pushing the received notification to the client computer system.

3. The method as described in claim 1 wherein the providing further includes:
   storing the received notification in a memory area at the server;
   receiving a notification request from the client computer system; and
   sending the stored notification to the client computer system in response to receiving the notification request.

4. The method as described in claim 3 wherein the client computer system sends the notification request in response to an expiring timer.

5. The method as described in claim 1 further comprising:
   registering a new notification listener wherein the registering is performed by the client computer system, the registering includes one or more second notification types;
   matching one or more second notification types with one or more of the first notification types; and
   configuring the remote receiver proxy to provide the client computer system the notifications that match the second notification types in response to the matching.

6. The method as described in claim 5 further comprising:
   storing the first notification types in a local memory area, the local memory area located in the client computer system; and
   storing one or more second notification types in the local memory area based upon the matching.

7. An information handling system comprising:
   one or more processors;
   a memory accessible by the processors;
   one or more nonvolatile storage devices accessible by the processors;
   a notification tool to provide notifications, the notification tool including:
   means for receiving a registration request at a server from the client computer system, the registration request including one or more first notification types;
   means for creating a remote receiver proxy on the server that is adapted to provide the client computer system the notifications that match the first notification types;
   means for comparing one or more received notifications with the first notification types;
   means for providing, from the remote receiver proxy, one or more of the received notifications with notification types matching the first notification types to the client computer system;
   means for detecting, at the client computer system, whether a notification listener is registered to receive one or more of the received notification types; and
   means for sending, at the client computer system, one or more of the received notifications to the notification listener in response to the detecting.

8. The information handling system as described in claim 7 wherein the providing further includes:
   means for pushing the received notification to the client computer system.

9. The information handling system as described in claim 7 wherein the providing further includes:
   means for storing the received notification in a memory area at the server;

means for receiving a notification request from the client computer system; and means for sending the stored notification to the client computer system in response to receiving the notification request.

10. The information handling system as described in claim 7 further comprising:

means for registering a new notification listener wherein the registering is performed by the client computer system, the registering includes one or more second notification types;

means for matching one or more second notification types with one or more of the first notification types; and means for configuring the remote receiver proxy to provide the client computer system the notifications that match the second notification types in response to the matching.

11. The information handling system as described in claim 10 further comprising:

means for storing the first notification types in a local memory area, the local memory area located in the client computer system; and means for storing one or more second notification types in the local memory area based upon the matching.

12. A computer program product stored in a computer operable media for providing notifications, said computer program product comprising:

means for receiving a registration request at a server from the client computer system, the registration request including one or more first notification types;

means for creating a remote receiver proxy on the server that is adapted to provide the client computer system the notifications that match the first notification types;

means for comparing one or more received notifications with the first notification types;

providing, from the remote receiver proxy, one or more of the received notifications with notification types matching the first notification types to the client computer system;

detecting, at the client computer system, whether a notification listener is registered to receive one or more of the received notification types; and sending, at the client computer system, one or more of the received notifications to the notification listener in response to the detecting.

13. The computer program product as described in claim 12 wherein the providing further includes:

means for pushing the received notification to the client computer system.

14. The computer program product as described in claim 12 wherein the providing further includes:

means for storing the received notification in a memory area at the server;

means for receiving a notification request from the client computer system; and means for sending the stored notification to the client computer system in response to receiving the notification request.

15. The computer program product as described in claim 14 wherein the client computer system sends the notification request in response to an expiring timer.

16. The computer program product as described in claim 12 further comprising:

means for registering a new notification listener wherein the registering is performed by the client computer system, the registering includes one or more second notification types;

means for matching one or more second notification types with one or more of the first notification types; and means for configuring the remote receiver proxy to provide the client computer system the notifications that match the second notification types in response to the matching.

17. The computer program product as described in claim 16 further comprising:

means for storing the first notification types in a local memory area, the local memory area located in the client computer system; and means for storing one or more second notification types in the local memory area based upon the matching.

* * * * *